UNITED STATES PATENT OFFICE.

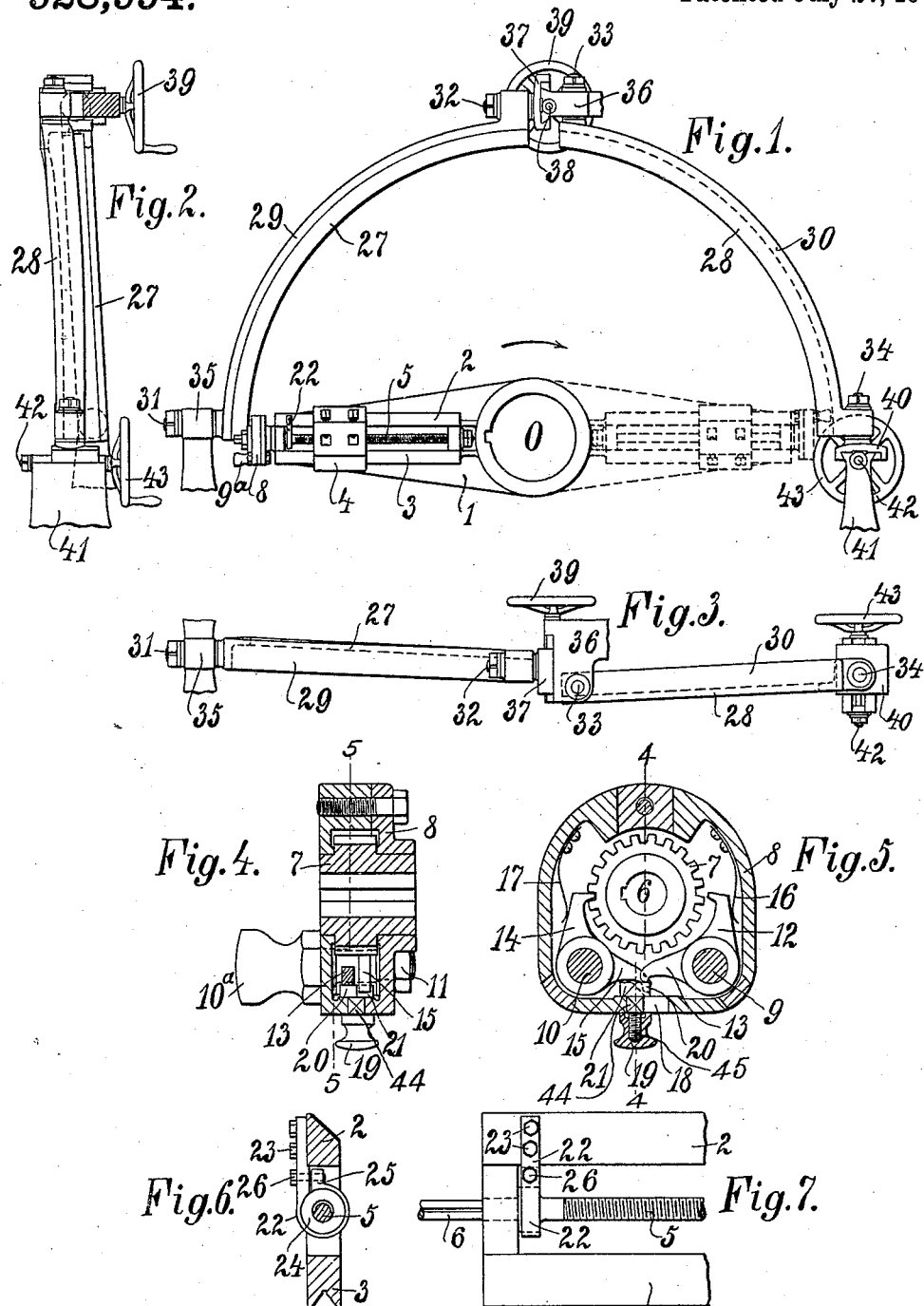

JOHANN MOLL, OF AUGSBURG, GERMANY.

FEED MECHANISM FOR METAL-WORKING MACHINES.

No. 928,994.  Specification of Letters Patent.  Patented July 27, 1909.

Application filed November 30, 1906. Serial No. 345,785.

*To all whom it may concern:*

Be it known that I, JOHANN MOLL, subject of the German Emperor, residing at Augsburg, in the Kingdom of Bavaria and Empire of Germany, have invented certain new and useful Improvements in Feed Mechanism for Metal-Working Machines, of which the following is a specification.

This invention relates to feed mechanism for metal working machines and is especially adapted for use in planing lathes and other classes of machines of this character in which the work is fixed and the tool performs its cutting action by being moved with respect to the work.

The invention will be more fully described in connection with the accompanying drawings and will be more particularly set forth and ascertained in and by the appended claims.

In the drawings, Figure 1 is a view in side elevation of a device embodying the main features of my invention. Fig. 2 is an end elevation thereof. Fig. 3 is a plan view of the device shown in Figs. 1 and 2. Fig. 4 is a sectional view on line 4—4 of Fig. 5. Fig. 5 is a sectional view on line 5—5 of Fig. 4. Fig. 6 is a sectional view on line 6—6 of Fig. 7. Fig. 7 is an enlarged detail view in elevation of one of the features of my invention.

Like characters of reference designate similar parts throughout the different figures of the drawings.

The invention will be described in connection with the specific embodiment shown but it will be understood that the invention is not to be limited to the specific disclosure except for such limitations as the claims import.

As herein shown the device of my invention is applied to a machine wherein the cutting tool rotates with respect to the work and the main shaft is designated by O and carries a tool supporting arm 1 which is adapted to rotate with said shaft. A tool carriage is radially and adjustably mounted on said arm and as shown said carriage consists of a block 4 provided with guide engaging portions adapted to slide in ways 2 and 3 formed on said arm 1. Means are provided for effecting radial adjustment of said block or carriage 4 which means may conveniently consist of a rotatably mounted threaded spindle 5 having threaded engagement with the block 4 and carried by the arm 1 as clearly shown in Fig. 1. Said spindle is provided with a braking surface which may desirably consist of an annular portion 24 and a braking member is adapted to engage said surface which braking member may comprise a strap 22 embracing the annular portion 24 and adapted to be adjusted with respect thereto by a bolt 26 passing through the body of said strap and through an extension or lug 25 thereon as clearly shown in Figs. 6 and 7. Said strap 22 is desirably anchored to the way 2 by means such for instance as bolts 23. The function of this braking device is to normally retard rotative movement of the spindle 5 and prevent reversal thereof under the action of operating mechanism hereinafter described.

The spindle 5 is desirably provided with an extension 6 to which is secured means for or whereby radial adjustment of the tool carriage may be effected. As shown said means consists of a casing 8 rotatably mounted upon hub extensions of an operating ratchet 7 as clearly shown in Fig. 4. The teeth of said ratchet 7 project radially into the casing and serve to hold the same in place and prevent lateral displacement, said ratchet wheel 7 being keyed or splined upon the extension 6. Said casing 8 is provided with bolts 9 and 10 which pass transversely through the same in parallel relation and are secured by nuts 11. The heads of said bolts are preferably provided with guide engaging portions or extensions $9^a$ and $10^a$ as clearly shown in Figs. 1 and 4. Means are provided for throwing the casing and the ratchet 7 into and out of operative relation with respect to each other which means as shown consists of pawls 12 and 14 adapted for engagement with the teeth of said ratchet wheel 7. Means are provided for throwing and maintaining either of said pawls out of operative relation with said ratchet wheel 7 and means are provided for normally tending to throw both of said pawls into engagement with said ratchet. Said first mentioned means as shown consists of cam levers 13 and 15 preferably formed integral with the pawls 12 and 14 respectively and cam blocks 20 and 21 adapted for engagement with said levers 13 and 15 respectively. As shown said cam blocks have inclined and horizontal surfaces and are adjustably mounted so that when they are adjusted in one position as shown in Fig. 5 for instance the cam block 20 engages the cam lever 13 and positively maintains the pawl 12 out of engagement with the ratchet 7. In this position of adjustment the cam block 21 is out of engagement with the lever 15 and thereby permits coöperation of the pawl 14 with the ratchet 7. The means for adjusting the cam blocks 20 and 21 may conveniently consist as shown of a stud 44, on which the cam blocks are mounted, and provided with a threaded extension 45 adapted to be engaged by a threaded thumb nut 19. Said stud 44 is desirably square in cross section and is slidably mounted in a slot 18 formed in the casing 8.

It will be obvious by reference to Fig. 5 that either of the pawls 12 and 14 may be positively thrown out of operative relation with the ratchet wheel 7 by loosening the thumb nut 19 and adjusting the stud 44 to either of its extreme positions. The means for maintaining the pawls in engagement with the ratchet wheel 7 may conveniently consist of springs 16 and 17 anchored to the casing 8 and engaging said pawls with their free ends. It will be obvious from the foregoing that assuming the parts are adjusted in the position shown in Fig. 5 movement imparted to the casing 8 in a clockwise direction would result in positively rotating the ratchet 7 and therethrough the spindle 5 causing displacement of the tool carriage. It will be further obvious that a reverse or contra-clockwise movement of the casing 8 would result in the pawl 14 sliding loosely over the ratchet wheel 7. Owing to the adjustment shown the pawl 12 would take no part in the foregoing operation.

I will next describe in detail the devices for effecting operation of the tool carriage adjusting or feeding means. Said devices preferably consist of two angularly disposed guide members adapted to be engaged by and to operate the casing 8 through the guide engaging portions 9ª and 10ª. The function of one of the guide members is to effect a working or feeding movement of the tool carriage and the function of the remaining member is to engage the casing 8 and restore it to a position for effecting a further adjustment of the tool carriage and said members will hereinafter be referred to as feeding and restoring members. In the device shown wherein the cutting tool rotates abreast of the work said members will be in the form of segments 27 and 28 which are preferably stiffened by ribs 29 and 30 respectively. The movement imparted to the ratchet wheel 7 by the feeding and restoring members is dependent upon the adjustment of said members with respect to the path of travel of the casing 8 and to this end the members 27 and 28 are as shown in the present embodiment mounted as follows. The restoring member, which in the present adjustment would be member 27, is provided with a pin 31 mounted to rotate horizontally in a bearing 35. The member 28, which in the present adjustment is the feeding member is mounted at its lower end to rotate in a horizontal plane in a vertically disposed stud 34 which as shown is mounted upon a carriage or slide 40. Said slide 40 is mounted upon a stationary part 41 and is adjustable thereon by means of an adjusting screw 42 and a hand wheel 43. The upper portions of said members 27 and 28 are connected as follows. A slide or carriage 37 is mounted upon a member 36 carried by member 28 and is adjustable thereon in a horizontal plane by means of an operating screw 38 and a hand wheel 39. Said carriage 37 carries a horizontally disposed stud 32 on which the member 27 is mounted. Said member 36 is mounted upon a vertically disposed stud 33 projecting upwardly from the member 28.

It will be seen from the foregoing that by adjusting the wheel 39 the members 27 and 28 may be displaced with respect to each other at any desired angle and it will be further noted that by adjusting the hand wheel 43 the lower end of the feeding member 28 will be positioned to effect any desired movement of the casing 8 when the feeding movement is being terminated.

The operation is as follows. Assuming that the parts are adjusted as shown in Fig. 5 and that the arm 1 is in the horizontal position shown in full lines in Fig. 1 and is being rotated in the direction of the arrow the guide portion 10ª will engage the restoring member 27 near the lower end of the latter and as the arm 1 approaches a vertical position the obliquely disposed restoring member 27 will have oscillated the casing 8 in a contra-clockwise direction throughout a fraction of a revolution causing the pawl 14 to slide freely over the teeth of the ratchet 7. The braking device hereinbefore described will prevent rotation of the spindle 5 during the contra-clockwise movement of the casing 8. After the arm 1 has passed the vertical the guide portion 9ª will engage the feeding member 28 and the oblique disposition of the latter with respect to the path of travel of the arm 1 will cause a clockwise oscillation of the casing 8 and the spring 17 will force the pawl 14 into engagement with the teeth of the ratchet 7 and there will be imparted a feeding adjustment to the spindle 5 in proportion to the oscillation effected by the feeding member 28. Assuming that the tool has been first adjusted so as to bring it in contact with the work at the outer periphery thereof it will be noted that the feed is very slowly imparted and assuming that each complete feeding adjustment is equal to the width of the cutting tool it will require, according to the embodiment shown, a full quarter revolution in order to adjust the tool to its full working cut. It will thus be seen that the feed is very gradual and that the device is not subjected to the injurious effects of sudden or quick feeding movements imparted to the tool. Assuming that the tool has been adjusted to its full cutting position and that the arm 1 has passed beyond the position shown in dotted lines in Fig. 1 no further adjustment or feed will be effected until the arm has again assumed the vertical position bringing the guide portion 9ª into engagement with the feeding member 28. In the meantime however it will have been necessary to restore the ratchet mechanism including the casing 8 to such a position that the guide member 9ª will engage the uppermost portion of the guide 28 and to this end the member 10ª will, when the arm 1 reaches the horizontal position shown in full lines in Fig. 1, engage the restoring member 27 and the latter will rotate the casing 8 so as to bring the portion 9ª into engaging proximity to the feeding member 28. If it is desired that 27 should act as the feeding member and 28 as the restoring member the cam stud 44 will be adjusted to the right of Fig. 5 and the pawl 14 will be thrown out of operative relation with the ratchet 7 by the cam block 21 while the cam block 20 will permit the spring 16 to throw the pawl 12 into operative relation with the ratchet wheel 7. It will thus be obvious that when the arm 1 is traveling in the direction of the arrow and the portion 10ª engages the member 27 a feeding adjustment will be imparted whereas when the arm reaches the member 28 and the guide member 9ª engages the same the parts will be restored and no movement will be imparted to the spindle 5.

I claim:

1. A feed mechanism for metal working machines comprising in combination, a rotary tool carrying arm, a tool support thereon, a threaded spindle for adjusting said support upon said arm, braking means for said spindle, a ratchet wheel rigidly mounted on said spindle, a casing loosely mounted on said wheel and surrounding the same, cam levers loosely mounted in said casing and provided with pawls for engagement with said ratchet wheel, adjustable cam blocks for preventing simultaneous engagement of said pawls with said wheel, guide and gaging portions for said casing, and segmental restoring and feeding members adapted for engagement with said guide portions to effect operation of said tool support.

2. A feed mechanism for metal working machines comprising in combination, a rotary tool carrying arm, a tool support thereon, a threaded spindle for adjusting said support upon said arm, a ratchet wheel rigidly mounted on said spindle, a casing loosely mounted on said wheel, cam levers loosely mounted in said casing and provided with pawls for engagement with said wheel, adjustable means for preventing simultaneous engagement of said pawls with said ratchet wheel, guide and gaging portions for said casing, and restoring and feeding members adapted for engagement with said guide portions to effect operation of said tool support.

3. A feed mechanism for metal working machines comprising in combination, a rotary tool carrying arm, a tool support thereon, a threaded spindle for adjusting said support on said arm, a ratchet wheel mounted on said spindle, a loosely mounted casing, a pawl carried by said casing for engagement with said wheel, guide portions for said casing, and restoring and feeding members adapted for engagement with said guide portions to effect operation of said tool support.

4. A feed mechanism for metal working machines comprising in combination, a rotary tool carrying member, a tool support thereon, means for effecting adjustment of said tool support, movable mechanism serving when moved in one direction to operate said means and adapted to be restored independently of said means, and segmental restoring and feeding members for said movable mechanism.

5. A feed mechanism for metal working machines comprising in combination, a rotary tool carrying member, a tool support thereon, means for effecting adjustment of said tool support, ratchet mechanism for operating said means and carried by said tool support, an oscillating member carrying a pawl for operating said ratchet mechanism, segmental restoring and feeding members for operating said oscillating member, and means for adjusting said restoring and feeding members in planes angular to the path of said ratchet mechanism.

6. A feed mechanism for metal working machines comprising in combination, a rotary tool carrying arm, a tool support thereon, means for effecting adjustment of said tool support, ratchet mechanism carried by said arm for operating said means, an oscillating member for operating said ratchet mechanism, a restoring member coöperating with said oscillating member carrying a pawl and having a horizontally disposed pivotal mounting, a feeding member coöperating with said oscillating member and having a vertically disposed pivotal mounting, and means for adjusting said feeding member at said vertical mounting.

7. A feed mechanism for metal working machines comprising in combination, a rotary tool carrying arm, a tool support thereon, means for effecting adjustment of said tool support, ratchet mechanism carried by said arm for operating said means, an oscillating member for operating said ratchet mechanism, a segmental restoring member coöperating with said oscillating member and having a horizontally disposed pivotal mounting, a segmental feeding member coöperating with said oscillating member and having a vertically disposed pivotal mounting, and adjustable means connecting the remaining ends of said segmental members.

In testimony whereof I affix my signature in presence of two witnesses.

JOHANN MOLL.

Witnesses:
CARL M. NERBECK,
LOUIS MUELLER.